US008064332B2

United States Patent
Shrivastava et al.

(10) Patent No.: US 8,064,332 B2
(45) Date of Patent: *Nov. 22, 2011

(54) AVOIDING COLLISIONS BETWEEN USERS IF MAP CONTAINING PERSISTENT SCHEDULING INFORMATION IS LOST

(75) Inventors: Shweta Shrivastava, Beaverton, OR (US); Rath Vannithamby, Portland, OR (US)

(73) Assignee: Intel Corporation

( * ) Notice: Subject to any disclaimer, the term of this patent is extended or adjusted under 35 U.S.C. 154(b) by 854 days.

This patent is subject to a terminal disclaimer.

(21) Appl. No.: 12/027,456

(22) Filed: Feb. 7, 2008

(65) Prior Publication Data
US 2009/0137253 A1 May 28, 2009

Related U.S. Application Data

(63) Continuation-in-part of application No. 11/945,924, filed on Nov. 27, 2007.

(51) Int. Cl.
*H04L 12/28* (2006.01)
(52) U.S. Cl. ........ 370/216; 370/312; 370/329; 370/341; 455/450
(58) Field of Classification Search .................. None
See application file for complete search history.

(56) References Cited

U.S. PATENT DOCUMENTS

| 7,627,348 | B2 * | 12/2009 | Lysejko et al. ............. 455/562.1 |
| 2003/0236977 | A1 * | 12/2003 | Levas et al. .................. 713/158 |
| 2006/0176845 | A1 * | 8/2006 | Sarkkinen ..................... 370/328 |
| 2007/0275656 | A1 * | 11/2007 | Chang et al. ...................... 455/9 |
| 2007/0291691 | A1 * | 12/2007 | Gorokhov ..................... 370/329 |
| 2008/0313518 | A1 * | 12/2008 | Naoe et al. ..................... 714/748 |
| 2009/0138598 | A1 | 5/2009 | Shrivastava et al. .......... 709/206 |

* cited by examiner

*Primary Examiner* — Chi H. Pham
*Assistant Examiner* — Shick Hom
(74) *Attorney, Agent, or Firm* — Cool Patent, P.C.; Joseph P. Curtin

(57) ABSTRACT

Briefly, in accordance with one or more embodiments, a MAP may be used by a base station to allocate network users for one or more users in a wireless network using persistent scheduling. In the event one or more of the users does not successfully receive a MAP transmitted by the base station, the user may stop transmitting and/or receiving in order to minimize and/or avoid collision with transmissions from other users. The affected user may transmit an indication of the error in receiving the MAP to the base station, wherein the base station may retransmit the previously transmitted MAP to the affected user that did not successfully receive the MAP from the origination transmission. One or more users may utilize a shared NAK channel to indicate to the base station an indication of the error in receive the MAP.

17 Claims, 3 Drawing Sheets

AVOIDING COLLISIONS BETWEEN USERS IF MAP CONTAINING PERSISTENT SCHEDULING INFORMATION IS LOST

CROSS-REFERENCE TO RELATED APPLICATIONS

The present application is a continuation-in-part of U.S. application Ser. No. 11/945,924 filed Nov. 27, 2007. Said application Ser. No. 11/945,924 is hereby incorporated by reference in its entirety.

BACKGROUND

In wireless networks using technologies, such as an Institute of Electrical and Electronics Engineers (IEEE) 802.16 standard, Worldwide Interoperability for Microwave Access (WiMAX), and/or a Third Generation Partnership Project (3GPP) standard or the like, the scheduling is centralized (referred to as dynamic scheduling) and may be performed by the base station (BS). The scheduling information is conveyed by the base station to one or more mobile stations (MS) in the form of control information that is referred to as MAP. The size of the MAP is proportional to the number of mobile stations scheduled in a given frame. If the packets to be scheduled are relatively small in size, such as in Voice over Internet Protocol (VoIP) type applications, then a relatively larger number of users can be scheduled in a frame, resulting in larger MAP overhead. Persistent scheduling is believed to be a potential mechanism to reduce such overhead. In persistent scheduling, instead of refreshing resource allocation for a given mobile station in every frame, a mobile station may be scheduled persistently for a multiple number of frames, for example, N frames. The scheduling or MAP information may be conveyed only in the first frame and then skipped in subsequent N −1 frames, thereby saving overhead.

A major problem with persistent scheduling may occur when one or more mobile stations lose the MAP information, for example due to poor channel conditions. In the case of dynamic scheduling, loss of MAP information in a given frame may result in wasted resources only in that particular frame. In the case of persistent scheduling, however, resources may be wasted in multiple frames. If a mobile station misses a MAP carrying the persistent allocation information, the base station will keep allocating resources every frame, but the allocated resources will not be used by the mobile station, thereby resulting in a waste of resources. If mobile station misses a MAP carrying cancellation of persistent allocation information, then the mobile station may continue transmitting in those resource blocks, and such transmission might collide with transmissions from one or more other mobile stations, which may result in wasted resources and/or unnecessary delay. The situation may worsen in which grouping and bitmap assignment are utilized since such information may affect multiple users, and any errors in the bitmap errors could propagate in time for several frames.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
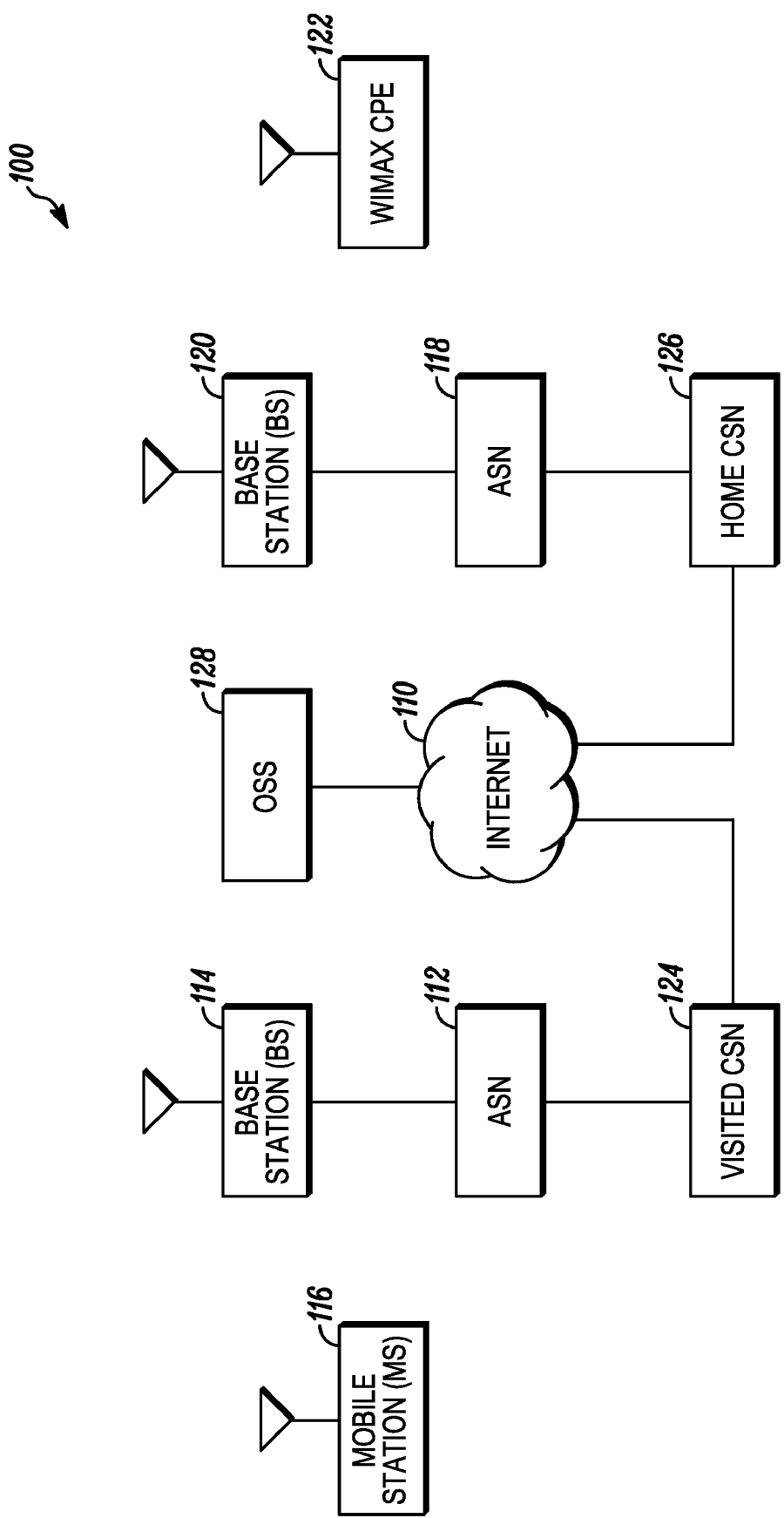
FIG. 1 is a block diagram of a wireless network in which collisions may be avoided if a MAP containing persistent scheduling information is lost in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over"may, however, also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a wireless network in which collisions may be avoided if a MAP containing persistent scheduling information is lost in accordance with one or more embodiments will be discussed. As shown in FIG. 1, network 100 may be an Internet Protocol (IP) type network comprising an Internet-type network 110 or the like that is capable of supporting mobile wireless access and/or fixed wireless access to Internet 110. In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, and the scope of the claimed subject matter is not limited in these respects. As an example of mobile wireless access, access service network (ASN) 112 is capable of coupling with base station (BS) 114 to provide wireless communication between mobile station (MS) 116 and Internet 110. Mobile station 116 may comprise a mobile type device or information handling system capable of wirelessly communicating via network 100, for example, a notebook-type computer, a cellular telephone, a personal digital assistant, or the like. ASN 112 may implement profiles that are capable of defining the mapping of network functions to one or more physical entities on network 100. Base station 114 may comprise radio equipment to provide radio-frequency (RF) communication with mobile station 116, and may comprise, for example, the physical layer (PHY) and media access control (MAC) layer equipment in compliance with an IEEE 802.16e type standard. Base station 114 may further comprise an IP backplane to couple to Internet 110 via ASN 112, although the scope of the claimed subject matter is not limited in these respects.

Network 100 may further comprise a visited connectivity service network (CSN) 124 capable of providing one or more network functions including, but not limited to, proxy and/or relay-type functions, for example, authentication, authorization and accounting (AAA) functions, dynamic host configuration protocol (DHCP) functions, or domain name service controls or the like, domain gateways, such as public switched telephone network (PSTN) gateways or Voice over Internet Protocol (VOIP) gateways, and/or Internet Protocol (IP) type server functions, or the like. These are, however, merely example of the types of functions that are capable of being provided by visited CSN or home CSN 126, and the scope of the claimed subject matter is not limited in these respects. Visited CSN 124 may be referred to as a visited CSN in the case, for example, in which visited CSN 124 is not part of the regular service provider of mobile station 116, for example, in which mobile station 116 is roaming away from its home CSN, such as home CSN 126, or for example, in which network 100 is part of the regular service provider of mobile station, but in which network 100 may be in another location or state that is not the main or home location of mobile station 116. In a fixed wireless arrangement, WiMAX type customer premises equipment (CPE) 122 may be located in a home or business to provide home or business customer broadband access to Internet 110 via base station 120, ASN 118, and home CSN 126 in a manner similar to access by mobile station 116 via base station 114, ASN 112, and visited CSN 124, a difference being that WiMAX CPE 122 is generally disposed in a stationary location, although it may be moved to different locations as needed, whereas mobile station 116 may be utilized at one or more locations if mobile station 116 is within range of base station 114, for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100; however, the scope of the claimed subject matter is not limited in these respects.

Figure 2:
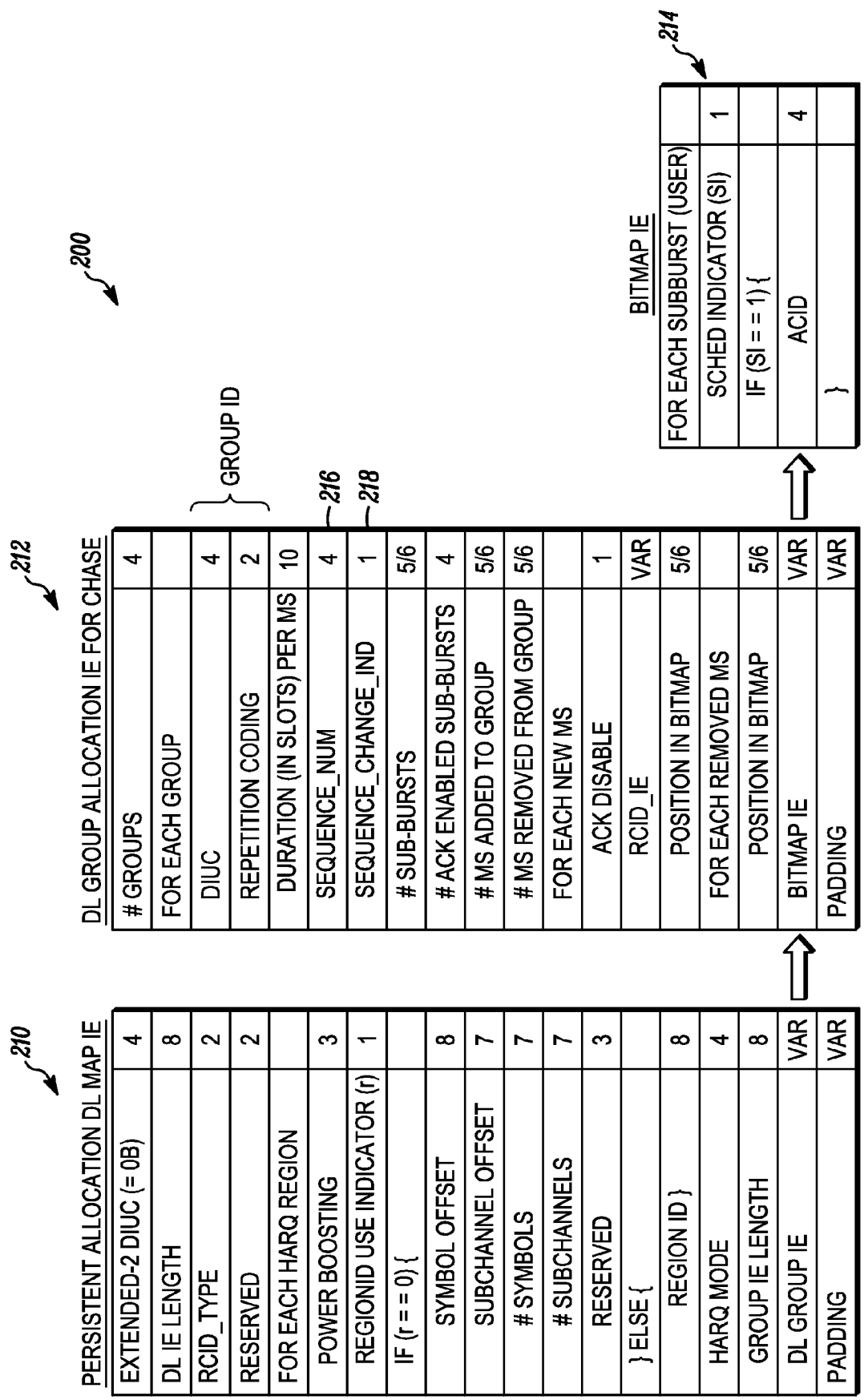
FIG. 2 is a diagram of a MAP including persistent scheduling fields utilized to assist in avoiding collisions if MAP information is lost in accordance with one or more embodiments.

Referring now to FIG. 2, a diagram of a MAP including persistent scheduling fields utilized to assist in avoiding collisions if MAP information is lost in accordance with one or more embodiments will be discussed. MAP 200 may comprise a Persistent Allocation Downlink (DL) MAP IE 210, a DL Group Allocation IE for Chase 212, and/or a Bitmap IE 214, which may be utilized for persistent scheduling of network resource by base station 120. Persistent scheduling can be performed either by specifying individual allocations for each mobile station 116 or by grouping the mobile stations 116 into one or more groups and allocating resources to the group as a whole. In the latter case, a bitmap is used to indicate which mobile stations 116 are in talk mode and which are in silence mode. The position in the bitmap also helps a mobile station 116 to determine which slots are allocated to the mobile station 116 within the resources of the group.

The information about persistent allocations may be carried in a special MAP element known as Persistent_Allocation_IE 210. In case of group allocation, there are multiple Group_Allocation_IEs 212 within each Persistent Allocation_IE 210. Each of these Group_allocation_IEs 212 may carry information about one group, including the bitmap 214 of the group. Since the Group_Allocation_IE 212 includes the bitmap 214, Group_Allocation_IE 212 may be transmitted in every frame. The Persistent_Allocation_IE 210 may be transmitted only when there is a change in allocation, or a Persistent_Allocation_IE 210 with minimal information may be transmitted in every frame. An example of Persistent_Allocation_IE 210 and Group_Allocation_IE 212 along with bitmap for downlink in WiMAX is shown in FIG. 2. The uplink IEs may also follow similar format. It should be noted, however, that MAP 200 shows merely one example format, and other formats may be implemented interchangeably, and the scope of the claimed subject matter is not limited in this respect.

In one or more embodiments, two new fields in MAP 200 Sequence_Number field 216 and Sequence Change_Indicator field 218 may be utilized to achieve collision avoidance. The value of Sequence_Number field 216 may be 4 bits in length, and its value may increase from 0 to 15 and then wrap around back to 0. Alternatively, other lengths for Sequence_Number field 216 may be utilized. The Sequence_Number field 216 and Sequence Change_Indicator field 218 are included in Persistent_Allocation_IE 210 for individual allocations and/or within the Group_Allocation_IE 212 for group allocations. The Sequence_Number field 216 may be incremented if there is a change in the corresponding Persistent_Allocation_IE 210 and/or Group_Allocation_IE 212. The value of Sequence_Change_Indicator field 218 is 1 bit in length. The value of Sequence_Change_Indicator field 218 is set to 1 in the frame in which the value of Sequence_Number field 4 is incremented, or otherwise set to 0. FIG. 2 shows how Sequence_Number field 216 and Sequence_Change_Indicator field 218 may be included in the structure of MAP 200; however, this is merely one example implementation and the scope of the claimed subject matter is not limited in this respect.

Figure 3:
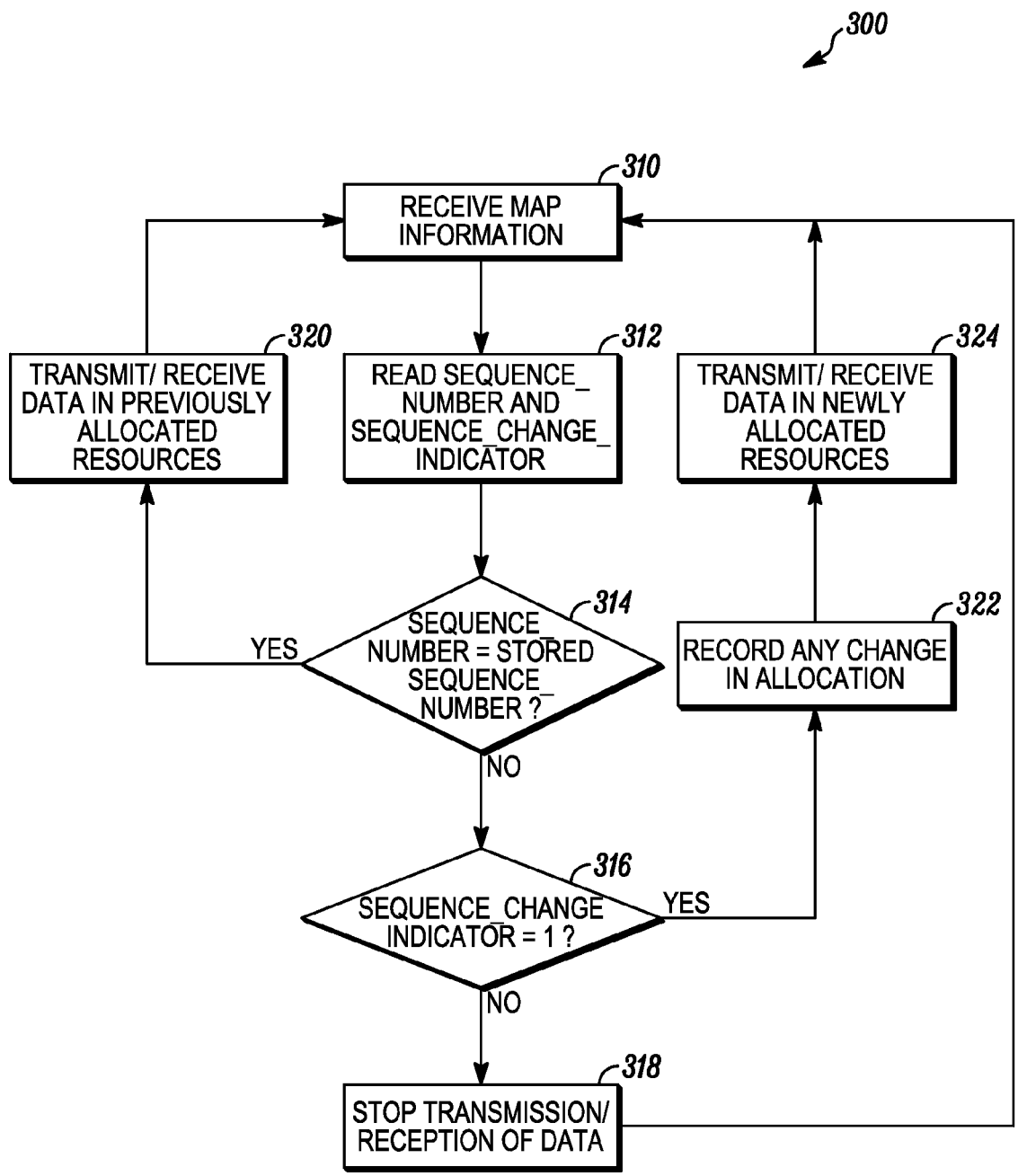
FIG. 3 is a flow chart of a method of avoiding collisions if MAP information is lost in accordance with one or more embodiments.

Referring now to FIG. 3, a flow chart of a method of avoiding collisions if MAP information is lost in accordance with one or more embodiments will be discussed. Method 300 of FIG. 3 shows one particular order of the blocks in the method; however, it should be noted that method 300 may comprise other orders of the blocks, with greater or fewer blocks, and the scope of the claimed subject matter is not limited in these respects. In one or more embodiments, a mobile station 116 stores the last received value for Sequence_Number field 216 and the last received MAP information in MAP 200. In the event a mobile station 116 misses one or more MAPs 200, the mobile station 116 may eventually receive a subsequent MAP 200 at block 310, and may then read the new value of Sequence_Number field 216 and Sequence_Change_Indicator field 218 at block 312 from the subsequently received MAP 200. The mobile station 216 may then determine at decision block 314 if the mobile station 216 lost any information pertaining to a change in the allocation information. If the new value of Sequence_Number field 216 is same as the one stored with mobile station 116, then the mobile station knows that there is no change in resource allocation and may continue to use previously allocated resources at block 320.

If the value new Sequence_Number field 216 is different from the one stored, the mobile station 116 checks at block 316 the value of Sequence_Change_Indicator field 218. If the value of this field is set to 1, then the mobile station 116 knows that the MAP element has changed only in the present frame, and then reads the new MAP element and at block 322 records the corresponding change in resource allocation. The mobiles station then uses the new allocation information to receive/transmit data at block 324. If, however, the value of Sequence_Change_Indicator field 218 is set to 0, then the mobile station 116 knows that it has missed a MAP element with change in allocation information. As a result, mobile station 116 immediately stops all transmission and/or reception of data at block 318 in order to avoid collision with other mobile stations 116. The mobile station 116 then continues to receive the MAP information at block 310 and waits for the base station 120 to detect the error and resend the missed MAP element.

The execution of method 300 at block 318 is the error condition in which the mobile station 116 stops all, or nearly all, reception and/or transmission of data in such an event in order to avoid collisions with other mobile stations. In such an event, the mobile station 116 in the error condition continues to read the MAP 200 even though it may not be transmitting or receiving. After a few frames, the base station 120 is capable of detects the error condition by lack of transmissions and/or acknowledgements (ACKs)/negative acknowledgments (NAKs) from the affected mobile station 116, and the base station 120 may then resend the last change in allocation information. Once the affected mobile station 116 receives this resent allocation information, mobile station 116 records the new resource allocation information and then may start sending and/or receiving data based at least in part on the new resource allocation information.

In one or more embodiments, the base station 120 is capable of detecting error conditions using its own procedure after a certain delay. It may, however, be more efficient for the mobile station 116 to convey the error condition information using to the base station 116 by using method 300 in order to notify the base station 120 of the error condition earlier than the base station 120 otherwise is capable of determining the error condition using its own procedure. Such earlier notifying the base station 120 of an error condition may reduce the delay and/or jitter for the traffic of the mobile stations 116. In one or more embodiments, any one or more multiple ways of conveying signaling of the error information from the mobile station 116 to the base station 120 may be implemented, and the scope of the claimed subject matter is not limited in this respect.

In one or more embodiments, a separate media access control (MAC) management message may be defined which the mobile station 116 may send to the base station 120 indicating to the base station 120 that the mobile station 116 has missed a MAP 200 after the mobile station 120 has detected the error. One possible format of such a MAC management message is shown in Table 1, below. In order to send a MAC management message, the mobile station 120 can request bandwidth from the base station 120 using existing mechanisms, for example a contention-based channel or channel quality indication channels (CQICH) codeword. Since the MAC management message is a new message, a reserved code for the message type, for example type 70, may be utilized. Basic connection identification (CID) is an existing parameter in a current WiMAX standard and identifies the mobile station 116. The Sequence_Num field contains the sequence number of the last MAP IE that the mobile station has received successfully.

TABLE 1

MAP Error Indication Message Format

| Syntax | Size (bits) | Notes |
| --- | --- | --- |
| MAP_Error_Indication_Message { | | |
| Management Message Type = 70 | 8 | Indicates the type of message |
| Basic CID | 16 | Basic CID of the MS - identifies the MS |
| Sequence_Num | 4 | Sequence Number of the last received MAP |
| Padding } | 4 | |

In one or more embodiments, a separate acknowledgment (ACK) channel may be utilized for MAP 200. In such an embodiment, the base station 120 would assign a separate ACK channel for all, or nearly all, persistently assigned mobile stations 116. The mobile stations 116 are allocated a position within the ACK channel in which the mobile station 116 may send 1-bit ACK/NAK information for the MAP 200. The ACK may comprise synchronous ACK so that it is clear which MAP 200 the particular ACK is associated with. If the base station 120 receives a negative acknowledgment (NAK) and/or no acknowledgment (ACK) is received, the base station 120 can determine that an error has occurred. The information about the location of this ACK channel may be conveyed in an uplink (UL) MAP. Using such ACK channel mechanisms, the base station 120 may determine the last MAP IE successfully received by the mobile station 116 so that base station 120 may retransmit a missed MAP IE to the mobile station. For a group of mobile stations 116, if any member of the group detects an error, a one-bit NAK channel may be used to notify base station 120 of the error immediately, or nearly immediately, and base station 120 may reassign resources and transmit a new MAP IE or retransmit the MAP IE that was missed to one or all of the mobile stations 116 in the group. With a NAK channel, some users may not receive the MAP IE, and then may indicate an error to base station 120. In one or more embodiments, two or more bits may be used for multiple members of the group. In such an embodiment, there may be more than one NAK channel, and one or more, or all, of the mobile stations 116 may share the same NAK channel. For example, for a group of 20 mobile stations 116, five mobile stations 116 could share one NAK channel (a single ACK/NAK bit), so 4 bits could be used for error notification, for example, coding could be applied, for the group of 20 mobile stations 116. In one or more embodiments, when using a NAK channel, any one or more of the users may indicate to base station 120 that a MAP IE was not received to notify base station that an error occurred, and base station 120 may then determine that at least one user in the group likely did not receive the MAP IE. In other words, for a NAK channel users transmit a negative acknowledgment in the event of an error in transmission. In contrast, when using an ACK channel, any one or more of the users may indicate to base station 120 that a MAP IE was received successfully, and base station 120 may determine that at least one user in the group likely did receive the MAP IE. In other words, for an ACK channel users may transmit a positive acknowledgment of a successful transmission. In one or more embodiments, either an ACK channel or a NAK channel, or combinations thereof, may be implemented. It should be noted that these are merely example mechanisms by which base station 120 may be notified by a mobile station 116 of an error condition so that base station 120 may retransmit missed MAP information to an affected mobile station 116; however, the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to avoiding collisions between users if MAP containing persistent scheduling information is lost and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting a MAP indicating the allocation of network resources for one or more users;
    indicating a MAP sequence number or a MAP sequence change indicator, or combinations thereof, in a group allocation table of the transmitted MAP;
    detecting an error condition for one or more of the users based on lack of transmissions, or acknowledgement/negative acknowledgements from the one or more users;
    retransmitting the MAP previously transmitted in said transmitting;
    receiving an error notification message from one or more users of an error condition in receiving the previously transmitted MAP; and
    retransmitting the previously transmitted MAP to the one or more users, including one or more users other than the user from which the error notification was received.

2. The method as claimed in claim 1, further comprising:
    if the MAP sequence number in the transmitted MAP is determined to be the same as a previously stored MAP sequence number for one or more users, transmitting and/or receiving data, or combinations thereof, using previously allocated resources as indicated in a previously transmitted MAP corresponding to the previously stored MAP sequence number.

3. The method as claimed in claim 1, further comprising:
    if the sequence change indicator indicates a change in the MAP, transmitting or receiving data, or combinations thereof, using allocated resources as indicated in the transmitted MAP.

4. The method as claimed in claim 1, the MAP comprising persistent allocation of resources information, group allocation of one or more users, or a bitmap of allocated resources for one or more of the users, or combinations thereof.

5. The method as claimed in claim 1, further comprising:
    receiving a negative acknowledgment in an ACK channel for MAP indicating the previously transmitted MAP was not successfully received by one or more users; and
    retransmitting the previously transmitted MAP to the one or more users, including one or more users other than the user from which the error notification was received, wherein one or more of the users are capable of sharing a NAK channel as a group of users, and wherein one or more groups of user are capable of being represented by an error notification word comprising one bit per group of users.

6. The method as claimed in claim 1, further comprising:
    receiving a MAC management message indicating the previously transmitted MAP was not successfully received by one or more users; and
    retransmitting the previously transmitted MAP to the one or more users.

7. The method as claimed in claim 4, wherein the error notification word is coded to represent multiple bits for multiple users.

8. The method as claimed in claim 1, wherein one or more of the users are capable of sharing a NAK channel for the message.

9. A method, comprising:
    transmitting a MAP indicating the allocation of network resources for one or more users;
    indicating a MAP sequence number or a MAP sequence change indicator, or combinations thereof, in a group allocation table of the transmitted MAP;
    detecting an error condition for one or more of the users indicating an error in receiving the MAP transmitted in said transmitting;
    retransmitting the MAP previously transmitted in said transmitting;
    receiving a negative acknowledgment in an ACK channel for MAP indicating the previously transmitted MAP was not successfully received by one or more users; and
    retransmitting the previously transmitted MAP to the one or more users, including one or more users other than the user from which the error notification was received, wherein one or more of the users are capable of sharing a NAK channel as a group of users, and wherein one or more groups of user are capable of being represented by an error notification word comprising one bit per group of users.

10. The method as claimed in claim 9, wherein the error notification word is coded to represent multiple bits for multiple users.

11. A method, comprising:
    transmitting a MAP indicating the allocation of network resources for one or more users;
    indicating a MAP sequence number or a MAP sequence change indicator, or combinations thereof, in a group allocation table of the transmitted MAP;
    detecting an error condition for one or more of the users based on lack of transmissions, or acknowledgement/negative acknowledgements from the one or more users; and
    retransmitting the MAP previously transmitted in said transmitting,
    wherein one or more of the users are capable of sharing a NAK channel for the message.

12. The method as claimed in claim 11, further comprising:
    if the MAP sequence number in the transmitted MAP is determined to be the same as a previously stored MAP sequence number for one or more users, transmitting and/or receiving data, or combinations thereof, using previously allocated resources as indicated in a previously transmitted MAP corresponding to the previously stored MAP sequence number.

13. The method as claimed in claim 11, further comprising:
if the sequence change indicator indicates a change in the MAP, transmitting or receiving data, or combinations thereof, using allocated resources as indicated in the transmitted MAP.

14. The method as claimed in claim 11, the MAP comprising persistent allocation of resources information, group allocation of one or more users, or a bitmap of allocated resources for one or more of the users, or combinations thereof.

15. The method as claimed in claim 11, further comprising:
receiving a negative acknowledgment in an ACK channel for MAP indicating the previously transmitted MAP was not successfully received by one or more users; and
retransmitting the previously transmitted MAP to the one or more users, including one or more users other than the user from which the error notification was received, wherein one or more of the users are capable of sharing a NAK channel as a group of users, and wherein one or more groups of user are capable of being represented by an error notification word comprising one bit per group of users.

16. The method as claimed in claim 15, wherein the error notification word is coded to represent multiple bits for multiple users.

17. The method as claimed in claim 11, further comprising:
receiving a MAC management message indicating the previously transmitted MAP was not successfully received by one or more users; and
retransmitting the previously transmitted MAP to the one or more users.

* * * * *

UNITED STATES PATENT AND TRADEMARK OFFICE
CERTIFICATE OF CORRECTION

PATENT NO. : 8,064,332 B2  
APPLICATION NO. : 12/027456  
DATED : November 22, 2011  
INVENTOR(S) : Shweta Shrivastava et al.

Page 1 of 1

It is certified that error appears in the above-identified patent and that said Letters Patent is hereby corrected as shown below:

In column 8, line 19, in claim 7, delete "4," and insert -- 5, --, therefor.

Signed and Sealed this
First Day of May, 2012

David J. Kappos
*Director of the United States Patent and Trademark Office*